Feb. 26, 1924.

W. J. WALL 1,485,100

AUXILIARY DEMOUNTABLE RIM FLANGE

Filed Sept. 21, 1921

Inventor
W. J. Wall
By D. Swift
Attorney

Patented Feb. 26, 1924.

1,485,100

UNITED STATES PATENT OFFICE.

WILLIAM J. WALL, OF CHRISTIANSBURG, VIRGINIA.

AUXILIARY DEMOUNTABLE-RIM FLANGE.

Application filed September 21, 1921. Serial No. 502,290.

*To all whom it may concern:*

Be it known that I, WILLIAM J. WALL, a citizen of the United States, residing at Christiansburg, in the county of Montgomery, State of Virginia, have invented a new and useful Auxiliary Demountable-Rim Flange; and I do hereby declare the following to be a full, clear, and exact description of the invention, such as will enable others skilled in the art to which it appertains to make and use the same.

The invention relates to demountable rims, and has for its object to provide in combination with a demountable rim carried by a wheel felly an annular plate having a flange adapted to engage the demountable rim flange, said plate being provided with spaced apertures for the reception of headed lugs carried by the felly of the wheel, and forced into one end of the aperature by eccentric cams pivoted to the annular plate.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1:
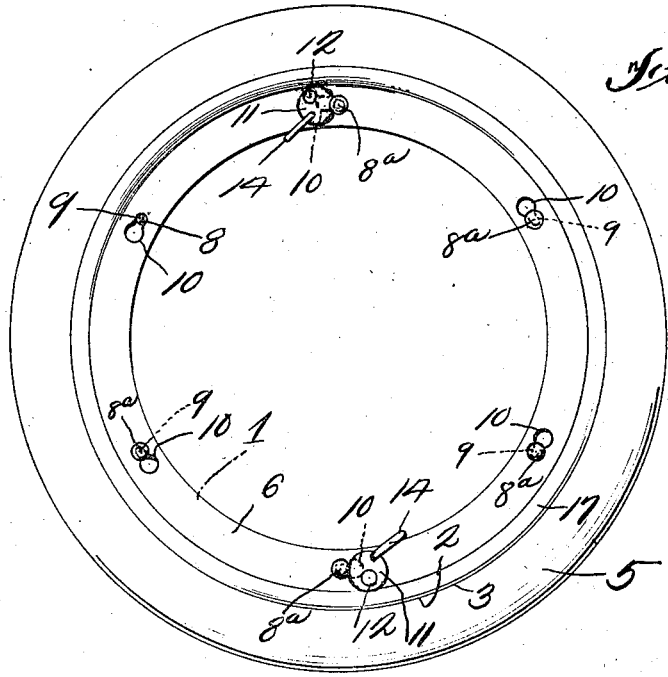
Figure 1 is a side elevation of a conventional form of automobile wheel, showing the auxiliary flange holding plate applied thereto.

Referring to the drawing, the numeral 1 designates a conventional form of felly of an automobile wheel, and 2 a demountable rim carried thereby, which demountable rim is provided with a flange 3 which engages a flange 4 of the tire 5, which tire is held on said demountable rim. It has been found that under excess lateral strain that demountable rims are forced from the periphery of the felly 1 and consequently in a great many cases wreck the automobile. To overcome this difficulty, and to provide a positive means for holding the demountable rim 2 against lateral movement, an annular plate 6 is provided, which plate engages the outer face 7 of the felly 1, and is held in close engagement therewith by means of headed lugs 8, which lugs are carried by bolts 9 extending transversely through the felly 1.

Annular plate 6 at spaced points thereon is provided with concentrically disposed elongated slots, one end of which slots is larger than the other end thereof, said slots being designated by the numerals 9 and the enlarged ends thereof by the numeral 10. When the plate 6 is placed in position, the heads $8^a$ of the headed lugs 8 are passed through the enlarged portions 10 of the slots 9, after which the eccentric plates or cams 11 are rotated on their pivotal points 12 in such a manner that their edges will engage the heads $8^a$ of the headed lugs, and force the annular plate circumferentially in such a manner that the shanks $8^b$ of the headed lugs will be forced into the restricted portions of the slots 9, thereby positioning the heads $8^a$ of the headed lugs where they will engage the outer face of the plate 6 and the plate 6 will be securely held in position on the felly 1. The head engaging surface of the eccentric plates 11 are provided with teeth 13 which engage the heads $8^a$ in such a manner that the eccentric plates 11 are prevented from movement except when force is applied thereto. Plates 11 may be provided with handle members 14 if so desired and by means of which handle members the operator may rotate the same.

Figures 2, 3:
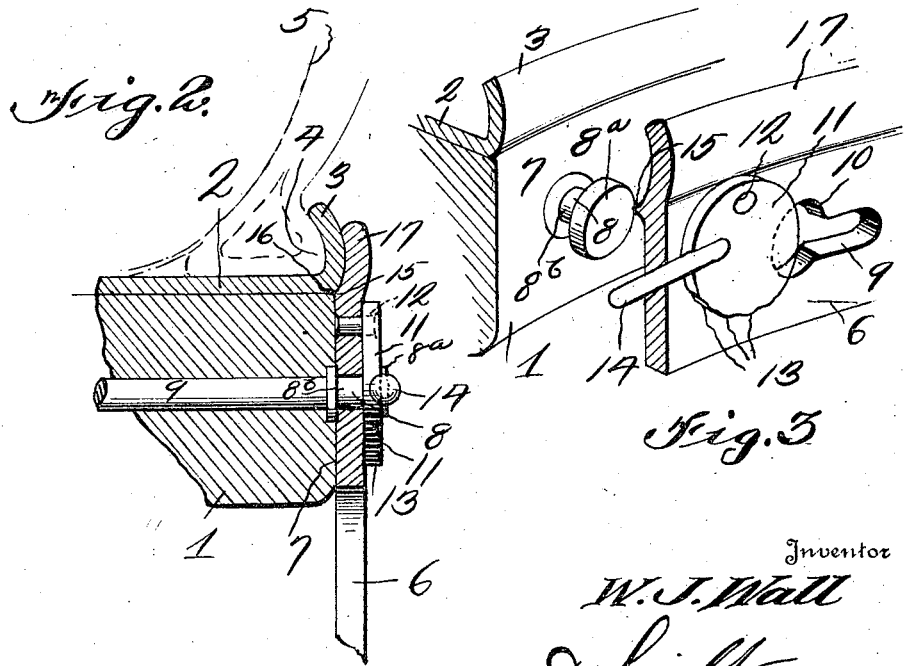
Figure 2 is a detail sectional view through the annular plate, a portion of the wheel felly and a portion of the demountable rim carried thereby.
Figure 3 is a detail collective view of a portion of the wheel felly showing the headed lug carried thereby and a portion of the annular rim holding plate.

The inner edge of the plate 6 is provided with a rib 15, which rib, when the plate is in position as shown in Figure 2, engages under the edge 16 of the demountable rim 2 and braces and supports said rim. The plate 6 is also provided with an upwardly extending flange 17, which flange engages the outer face of the demountable rim flange 3 and braces the same against bending or the demountable rim as a whole against lateral movement outwardly on the periphery of the felly 1.

From the above it will be seen that a holding plate is provided for remountable rims, which plate may be easily and quickly placed in position on the wheel in such a manner as to hold the demountable rim, and that the structure is simple, parts reduced to a minimum and the parts so formed the device may be cheaply made.

The invention having been set forth what is claimed as new and useful is:—

The combination with a wheel felly having a demountable rim thereon, of means for holding said demountable rim on said felly, said means comprising an annular plate engaging the outer face of the felly and the outer face of the demountable rim and provided with concentrically disposed slots having one of their ends larger than their other ends, headed lugs carried by the felly and adapted to be passed through the enlarged portions of the concentrically disposed slots, eccentric clamp plates pivoted to the annular plate adjacent the enlarged portions of the slots and forming means cooperating with the heads of the headed lugs whereby the annular plate may be moved to a position where the headed lugs will be forced into the reduced portions of the slots and held therein by the engagement of the headed lugs with the outer face of the annular plate, said eccentric plates being provided with recesses in their peripheries for the reception of the heads of the headed lugs, and handle members extending outwardly from the eccentric plate, and positioned thereon whereby when the plates are in operative position said handle members will extend inwardly in relation to the wheel felly.

In testimony whereof I have signed my name to this specification in the presence of two subscribing witnesses.

WILLIAM J. WALL.

Witnesses:
C. S. GILL,
MRS. ANNA GILL.